United States Patent
Pozniansky et al.

(10) Patent No.: US 8,452,169 B2
(45) Date of Patent: *May 28, 2013

(54) CONTROL OF ARTIFICIAL LIGHTING OF A SCENE TO REDUCE EFFECTS OF MOTION IN THE SCENCE ON AN IMAGE BEING ACQUIRED

(75) Inventors: Eli Pozniansky, Santa Clara, CA (US); Shimon Pertsel, Sunnyvale, CA (US)

(73) Assignee: CSR Technology Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/369,173

(22) Filed: Feb. 8, 2012

(65) Prior Publication Data

US 2012/0148224 A1  Jun. 14, 2012

Related U.S. Application Data

(63) Continuation of application No. 12/709,667, filed on Feb. 22, 2010, now Pat. No. 8,190,016, which is a continuation of application No. 11/552,717, filed on Oct. 25, 2006, now Pat. No. 7,697,836.

(51) Int. Cl.
*G03B 15/03*  (2006.01)

(52) U.S. Cl.
USPC ............................ 396/159; 369/153; 369/263

(58) Field of Classification Search
USPC ........................................................ 396/159
See application file for complete search history.

(56) References Cited

U.S. PATENT DOCUMENTS

| | | | |
|---|---|---|---|
| 3,626,827 | A | 12/1971 | Yanagi et al. |
| 3,690,234 | A | 9/1972 | Costianes |
| 3,828,122 | A | 8/1974 | McPhee et al. |
| 4,218,119 | A | 8/1980 | Schickedanz et al. |
| 5,043,816 | A | 8/1991 | Nakano et al. |
| 5,220,375 | A | 6/1993 | Ishida et al. |

(Continued)

FOREIGN PATENT DOCUMENTS

| | | |
|---|---|---|
| JP | H04-038778 | 2/1992 |
| JP | 05-34757 | 2/1993 |

(Continued)

OTHER PUBLICATIONS

Pertsel et al., "Camera Exposure Optimization Techniques That Take Camera and Scene Motion Into Account," U.S. Appl. No. 11/258,975, filed Oct. 25, 2005, 30 pages.

(Continued)

*Primary Examiner* — Clayton E Laballe
*Assistant Examiner* — Dennis Hancock
(74) *Attorney, Agent, or Firm* — Frommer Lawrence & Haug LLP; John W. Branch

(57) ABSTRACT

Motion of an image of a scene being captured by a digital image acquisition device is detected and used to control parameters of illumination of the scene by a flash lamp that is typically built into the device. Parameters that may be controlled include the intensity, duration and timing of light emitted by the flash lamp. Such control of the flash illumination is preferably performed in conjunction with adjusting one or more exposure parameters used to capture an image. Such exposure parameters include duration, aperture and sensor gain. Motion blur caused by movement of the camera or by movement of an object within the scene being photographed is reduced by selecting appropriate exposure parameters and flash light characteristics.

20 Claims, 8 Drawing Sheets

U.S. PATENT DOCUMENTS

| | | | |
|---|---|---|---|
| 5,223,935 | A | 6/1993 | Tsuji et al. |
| 5,255,044 | A | 10/1993 | Ishiguro et al. |
| 5,490,225 | A | 2/1996 | Kumagai et al. |
| 5,692,223 | A | 11/1997 | Ichikawa et al. |
| 5,742,340 | A | 4/1998 | Alves |
| 5,905,848 | A | 5/1999 | Yano et al. |
| 5,999,746 | A | 12/1999 | Kitagawa et al. |
| 6,072,525 | A | 6/2000 | Kaneda et al. |
| 6,173,121 | B1 | 1/2001 | Tomita et al. |
| 6,301,440 | B1 | 10/2001 | Bolle et al. |
| 6,532,264 | B1 | 3/2003 | Kahn |
| 6,859,618 | B1 | 2/2005 | Yip et al. |
| 6,891,570 | B2 | 5/2005 | Tantalo et al. |
| 6,900,846 | B2 | 5/2005 | Lee et al. |
| 6,903,764 | B2 | 6/2005 | Kusaka et al. |
| 6,914,624 | B1 | 7/2005 | Esquibel et al. |
| 6,961,518 | B2 | 11/2005 | Suzuki |
| 7,030,911 | B1 | 4/2006 | Kubo |
| 7,546,026 | B2 | 6/2009 | Pertsel et al. |
| 7,692,715 | B2 | 4/2010 | Kitajima |
| 7,697,836 | B2 | 4/2010 | Pozniansky et al. |
| 7,796,872 | B2 | 9/2010 | Sachs et al. |
| 8,013,909 | B2 | 9/2011 | Nikkanen et al. |
| 2002/0039137 | A1 | 4/2002 | Harper et al. |
| 2003/0063322 | A1 | 4/2003 | Itoh et al. |
| 2003/0095189 | A1 | 5/2003 | Liu et al. |
| 2003/0174772 | A1 | 9/2003 | Voronov et al. |
| 2003/0180037 | A1 | 9/2003 | Sommers |
| 2004/0130628 | A1 | 7/2004 | Stavely |
| 2004/0160525 | A1 | 8/2004 | Kingetsu et al. |
| 2004/0169768 | A1 | 9/2004 | Lee et al. |
| 2004/0218079 | A1 | 11/2004 | Stavely et al. |
| 2004/0239771 | A1 | 12/2004 | Habe |
| 2004/0252230 | A1 | 12/2004 | Winder |
| 2004/0252765 | A1 | 12/2004 | Hosoda |
| 2005/0041121 | A1* | 2/2005 | Steinberg et al. ............. 348/239 |
| 2005/0128343 | A1 | 6/2005 | Murata et al. |
| 2006/0008171 | A1 | 1/2006 | Petschnigg et al. |
| 2006/0017814 | A1 | 1/2006 | Pinto et al. |
| 2006/0017837 | A1 | 1/2006 | Sorek et al. |
| 2006/0029377 | A1 | 2/2006 | Stavely et al. |
| 2006/0029382 | A1 | 2/2006 | Uchida |
| 2006/0039690 | A1 | 2/2006 | Steinberg et al. |
| 2006/0056835 | A1 | 3/2006 | Poon et al. |
| 2006/0115297 | A1 | 6/2006 | Nakamaru |
| 2006/0170816 | A1 | 8/2006 | Silverstein et al. |
| 2006/0187308 | A1 | 8/2006 | Lim et al. |
| 2007/0009245 | A1 | 1/2007 | Ito |
| 2007/0071424 | A1 | 3/2007 | Poon et al. |
| 2008/0043112 | A1 | 2/2008 | Nikkanen et al. |
| 2008/0044170 | A1 | 2/2008 | Yap et al. |
| 2009/0040364 | A1 | 2/2009 | Rubner |
| 2009/0102935 | A1* | 4/2009 | Hung et al. ................ 348/222.1 |
| 2009/0154821 | A1 | 6/2009 | Sorek et al. |
| 2009/0231449 | A1 | 9/2009 | Tzur et al. |
| 2009/0256921 | A1 | 10/2009 | Pertsel et al. |
| 2010/0150540 | A1 | 6/2010 | Pozniansky et al. |
| 2010/0201826 | A1 | 8/2010 | Steinberg et al. |

FOREIGN PATENT DOCUMENTS

| | | |
|---|---|---|
| JP | H06-176514 | 6/1994 |
| JP | 06-308588 | 11/1994 |
| JP | H07-307889 | 11/1995 |
| JP | H08-256289 | 10/1996 |
| JP | 08-320511 | 12/1996 |
| JP | 08-327917 | 12/1996 |
| JP | 10-174027 | 6/1998 |
| JP | H10-336511 | 12/1998 |
| JP | 11-088810 | 3/1999 |
| JP | 11-326980 A | 11/1999 |
| JP | H11-346326 | 12/1999 |
| JP | 2002-359756 | 12/2002 |
| JP | 2004-215283 | 7/2004 |
| JP | 2005-109824 | 4/2005 |

OTHER PUBLICATIONS

"Xenon flash lamp," from Wikipedia, http://en.wikipedia.org/wiki/Xenon_flash_lamp, downloaded on Jul. 5, 2006, 3 pages.

International Search Report and Written Opinion for International Patent Application No. PCT/US2007/082128, mailed May 15, 2008.

International Preliminary Report on Patentability for International Patent Application No. PCT/US2007/082128, mailed May 7, 2008.

International Search Report and Written Opinion for International Patent Application No. PCT/US2006/060056, mailed Sep. 6, 2007.

International Preliminary Report on Patentability for International Patent Application No. PCT/US2006/060056, mailed May 8, 2008.

Official Communication for Chinese Patent Application No. 200680049194.8, mailed Mar. 19, 2010.

Official Communication for Chinese Patent Application No. 200680049194.8, mailed Sep. 7, 2010.

Official Communication for Japanese Patent Application No. H10-544219 dated Mar. 19, 2008.

Official Communication for Japanese Patent Application No. 2008-538133 mailed Aug. 29, 2011.

Official Communication for European Patent Application No. 06850051.1, mailed Feb. 24, 2009.

Official Communication for U.S. Appl. No. 11/552,717, mailed Jun. 25, 2009.

Official Communication for U.S. Appl. No. 11/552,717, mailed Feb. 9, 2010.

Official Communication for U.S. Appl. No. 11/258,975, mailed Jun. 4, 2008.

Official Communication for U.S. Appl. No. 11/258,975, mailed Nov. 28, 2008.

Official Communication for U.S. Appl. No. 11/258,975, mailed Feb. 9, 2009.

Official Communication for U.S. Appl. No. 11/258,975, mailed Apr. 10, 2009.

Official Communication for U.S. Appl. No. 12/479,703 mailed Sep. 28, 2011.

Official Communication for U.S. Appl. No. 12/479,703 mailed Feb. 2, 2012.

Official Communication for U.S. Appl. No. 12/397,727 mailed Jun. 21, 2011.

Official Communication for U.S. Appl. No. 12/397,727 mailed Dec. 30, 2011.

Official Communication for U.S. Appl. No. 12/709,667, mailed Sep. 16, 2010.

Official Communication for U.S. Appl. No. 12/709,667 mailed Apr. 15, 2011.

Official Communication for U.S. Appl. No. 12/709,667 mailed Aug. 3, 2011.

Official Communication for U.S. Appl. No. 12/709,667 mailed Nov. 9, 2011.

Official Communication in Japanese Patent Application No. 2008-538133 transmitted Jun. 11, 2012.

Official Communication in U.S. Appl. No. 12/397,727 mailed Apr. 4, 2012.

Official Communication for U.S. Appl. No. 12/397,727 mailed Apr. 1, 2013.

* cited by examiner

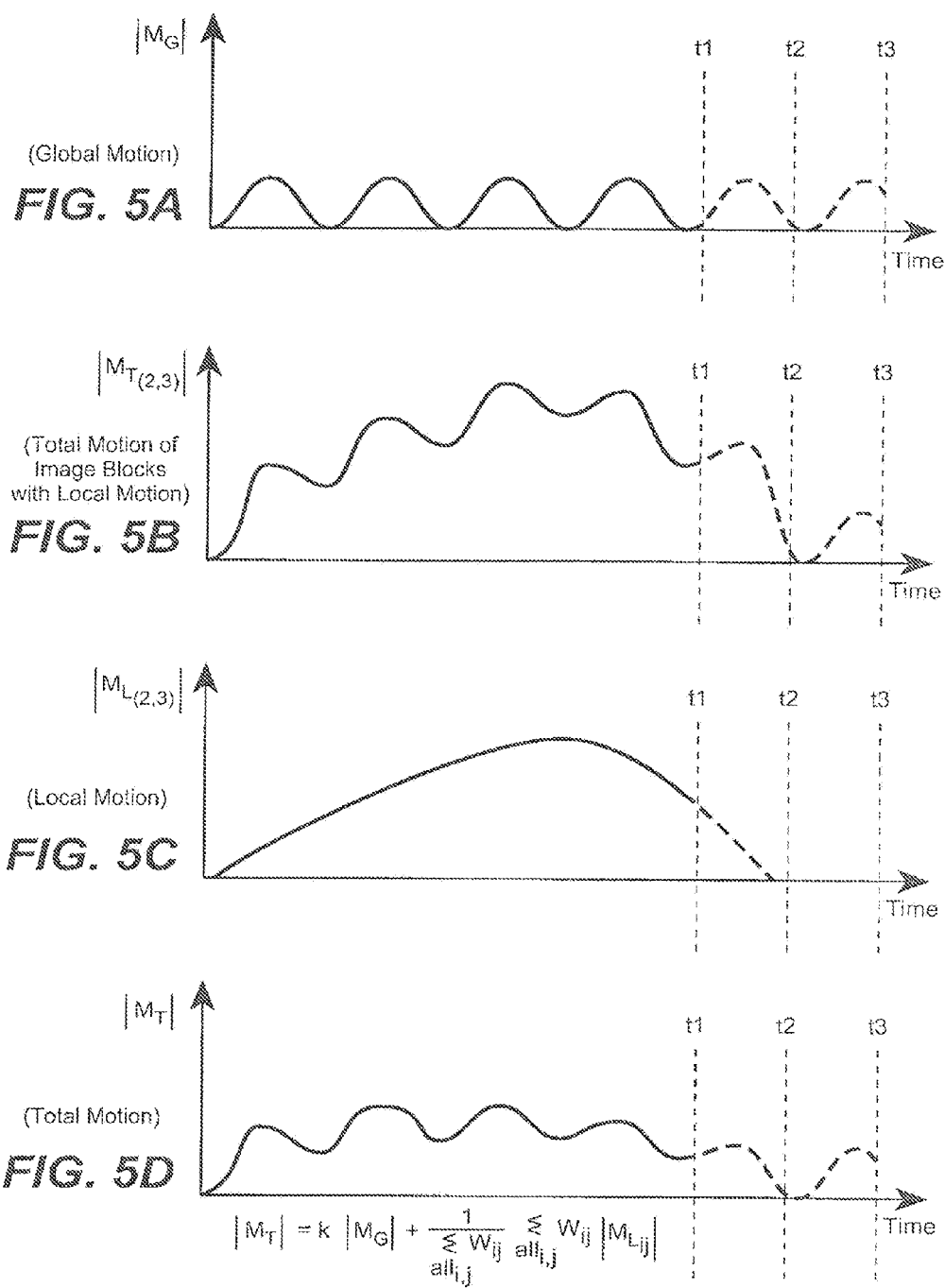

CONTROL OF ARTIFICIAL LIGHTING OF A SCENE TO REDUCE EFFECTS OF MOTION IN THE SCENCE ON AN IMAGE BEING ACQUIRED

CROSS-REFERENCE TO RELATED APPLICATION

This application is a continuation of U.S. application Ser. No. 12/709,667 filed on Feb. 22, 2010, which is a continuation of U.S. application Ser. No. 11/552,717 filed on Oct. 25, 2006, which are both incorporated herein in their entirety by this reference.

BACKGROUND AND SUMMARY

This application relates to automatic exposure control of digital cameras and other electronic digital image acquisition devices, and particularly to the control of scene illumination by flash light during the capture of image data of the scene.

Electronic cameras image scenes onto a two-dimensional sensor such as a charge-coupled-device (CCD), a complementary metal-on-silicon (CMOS) device or other type of light sensor. These devices include a large number of photodetectors (typically two, three, four or more million) arranged across a small two dimensional surface that individually generate a signal proportional to the intensity of light or other optical radiation (including infrared and ultra-violet regions of the spectrum adjacent the visible light wavelengths) striking the element. These elements, forming pixels of an image, are typically scanned in a raster pattern to generate a serial stream of data representative of the intensity of radiation striking one sensor element after another as they are scanned. Color data are most commonly obtained by using photodetectors that are sensitive to each of distinct color components (such as red, green and blue), alternately distributed across the sensor.

A popular form of such an electronic camera is a small hand-held digital camera that records data of a large number of picture frames either as still photograph "snapshots" or as sequences of frames forming a moving picture. A significant amount of image processing is typically performed on the data of each frame within the camera before storing on a removable non-volatile memory such as a magnetic tape cartridge, a flash memory card, a recordable optical disc or a removable hard disk drive. The processed data are typically displayed as a reduced resolution image on a liquid crystal display (LCD) device on the outside of the camera. The processed data are also typically compressed before storage in the non-volatile memory in order to reduce the amount of storage capacity that is taken by the data for each picture frame.

The data acquired by the image sensor are typically processed to compensate for imperfections of the camera and to generally improve the quality of the image obtainable from the data. The correction for any defective pixel photodetector elements of the sensor is one processing function. Another is white balance correction wherein the relative magnitudes of different pixels of the primary colors are set to represent white. This processing also includes de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors is also typically performed within the camera. Other processing typically includes one or more of gamma correction, contrast stretching, chrominance filtering and the like.

Electronic cameras also nearly always include an automatic exposure control capability that sets the exposure time, size of its aperture opening and analog electronic gain of the sensor to result in the luminescence of the image or succession of images being at a certain level based upon calibrations for the sensor being used and user preferences. These exposure parameters are calculated in advance of the picture being taken, and then used to control the camera during acquisition of the image data. For a scene with a particular level of illumination, a decrease in the exposure time is made up by increasing the size of the aperture or the gain of the sensor, or both, in order to obtain the data within a certain luminescence range. An increased aperture results in an image with a reduced depth of field and increased optical blur, and increasing the gain causes the noise within the image to increase. Conversely, when the exposure time can be increased, such as when the scene is brightly lighted, the aperture and/or gain are reduced, which results in the image having a greater depth of field and/or reduced noise. In addition to analog gain being adjusted, or in place of it, the digital gain of an image is often adjusted after the data have been captured.

It is often difficult for the user to hold a camera by hand during an exposure without imparting some degree of shake or jitter, particularly when the camera is very small and light. As a result, the captured image may have a degree of overall motion blur that depends on the exposure time, the longer the time the more motion blur in the image. In addition, long exposures of a scene that is totally or partially moving can also result in motion blur in the captured image. A person or object moving across the scene, for example, may appear blurred in the image. The automatic exposure processing of existing cameras does not take into account motion of the camera or motion within the scene when calculating the exposure parameters to be used to capture an image of the scene.

U.S. patent application Ser. No. 11/258,975, filed Oct. 25, 2005, entitled "Camera Exposure Optimization Techniques That Take Camera and Scene Motion into Account," does consider image motion when setting exposure parameters. Motion is detected and the exposure parameters are set, in advance of capturing data of the image, to levels that enhance the captured image based on the amount of motion of the scene relative to the image frame within the camera. Blur of the image caused by either camera shake or local motion within the scene, or both, can be minimized or even prevented by adjusting the exposure parameters. Conversely, in cases where little or no motion is detected prior to capturing the image data, the exposure parameters may be set to optimize other aspects of the image, such as increasing the exposure time in order to allow the depth of field to be increased and/or the level of noise to be reduced.

Motion is preferably measured by calculating motion quantities from data of two or more images prior to capturing data of the final image (using "pre-capture" images). Motion quantities that define the amount of motion of the scene image relative to the camera, including motion within the scene, are preferably calculated. Such relative motion quantities may include direction, thereby being motion vectors, or may just express the magnitude of the motion. By this technique, local motion vectors are individually calculated for distinct blocks of pixels within the image, which then allows motion within the scene to be taken into account when calculating the exposure parameters. Global motion vectors, such as caused by camera shake, can also be calculated from data of the two or more pre-capture images. Although the presence of motion blur can be detected from data of a single image, the calculation of motion vectors from two or more pre-capture images is more precise and leads to better control of the exposure parameters used to subsequently capture the image. Use of a mechanical motion sensor, which is included in some cameras, can only provide an indication of any global motion, not individual motion of objects or portions within the scene being photographed.

The results of the image motion calculations may also be used to estimate future motion so that a time to capture data of the image may be chosen where the absolute velocity of motion is at least less than at other times and possibly minimal. Particularly in the case of camera shake, where the motion often has some periodicity to it that can be forecasted, the picture can be taken at a time when the global motion is zero or near zero. The velocity of a portion of the scene can also be forecasted in the same way and a time chosen to take the picture when the local motion blur is minimized. When doing this forecasting, the exposure parameters are preferably calculated from the motion quantities that are expected to exist at the time scheduled for capturing the image.

In a specific implementation, when the ambient light is sufficient, preliminary exposure parameters are first calculated in the same manner as in existing cameras, without regard to any motion of the camera or portions of the scene image. If these preliminary parameters are at levels where their adjustment is not likely to improve the quality of the image, then the image is captured with them and the results of motion calculations are not used. An example where this can occur is with a brightly lighted scene, where the preliminary exposure time is nearly as short, the aperture nearly as small and the gain nearly as low as the camera allows. In such a case, the exposure time can neither be significantly shortened to limit any motion blur nor increased to significantly improve depth of field or reduce noise since the aperture and gain level are nearly as small as possible. But when this is not the case, the preliminary exposure parameters are adjusted on the basis of the image motion calculations to reduce the amount of or eliminate motion blur in the captured image.

According to improvements described herein, motion blur in the image may also be reduced or eliminated by controlling parameters of artificial light illuminating the captured scene. This is done both when a low light level of a portion or the entire scene makes it desirable to illuminate the scene with artificial light, or when the ambient illumination is sufficient but use of artificial illumination improves the quality of the captured image. In a specific implementation, motion blur of the resulting image may be reduced or eliminated by controlling parameters of the artificial light instead of adjusting the exposure parameters for this purpose. Such light is typically provided by one or more flash light sources, preferably built directly into the camera. Any or all of the intensity, duration, number and timing of flash light pulse(s) occurring during exposure may be controlled to reduce motion blur.

In yet another specific implementation, calculations of both the exposure parameters and those of artificial light that illuminates the scene may be made from the detected motion and these parameters then used to capture an image of the scene. The exposure and artificial light parameters cooperate to reduce or eliminate motion blur. They may also be selected to enhance the image by providing a more even luminance across it.

Further, when there is little or no motion of the image, the exposure duration and other parameters may at times be chosen according to the improved techniques herein to eliminate the need for artificial illumination or reduce its strength, thereby resulting in a captured image with better quality. But generally, the improved techniques described herein primarily allow acquiring images of scenes with low levels of ambient illumination that require artificial illumination. Parameters of the artificial illumination are calculated from quantities of motion detected in the image in order to reduce or eliminate motion blur.

The precise control of flash or other artificial light described herein is preferred over an approach of employing a sensor with greater sensitivity, and using the blur reducing techniques described in aforementioned U.S. patent application Ser. No. 11/258,975, without artificial illumination of the scene. This stems from the fact that increasing sensor sensitivity is becoming more difficult and expensive each year as the number of megapixels incorporated into the average image sensor used in a digital camera annually increases for competitive reasons. When the number of light gathering elements in a sensor increases, the size of each element is reduced, with a corresponding reduction in the sensitivity of each element, due to each element having a smaller area, and thus intercepting a lower amount of radiant energy.

The improved techniques of controlling exposure and/or artificial light parameters are also preferred over other ways that have been used or suggested for minimizing or eliminating motion blur in the image. An extremely short duration electronic strobe flash can be used to effectively stop any image motion so long as the exposure duration is limited to substantially the duration of the light pulse. But this also causes the resulting image to look very unnatural, with a brightly lit foreground and a very dark background. The control of exposure and/or flash parameters by detected image motion that are described herein allow better control of image brightness. For example, if the image motion is not extreme, the flash pulse may be made to have a longer duration than the short probe and thus a lesser intensity, thereby to provide better balance in image luminance between the largely flash illuminated foreground and ambient illuminated background.

Another approach made unnecessary by the improved techniques described herein is the use of optical stabilization to compensate for hand jitter that is provided on some cameras. In one line of cameras, vibration reduction lenses are used. A measurement of camera motion causes the position of the lens to be moved in a manner that moves the image in a direction and distance across the photosensor that is equal and opposite to the direction of image movement caused by motion of the camera. This is a complicated electro-mechanical system and cannot compensate for motion of one object within a scene relative to other objects of the scene.

Various aspects, advantages, features and embodiments of the present invention are included in the following description of exemplary examples thereof, which description should be taken in conjunction with the accompanying drawings.

All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIGS. 5A-5D represent amounts of motion of the image frame of FIG. 4, in an illustrative example;

DETAILED DESCRIPTION OF EXEMPLARY EMBODIMENTS

Video data acquired by a digital camera are typically processed to compensate for imperfections of the camera and to generally improve the quality of the image obtainable from the data. The correction for any defective pixel photodetector elements of the sensor is one processing function that may be performed. Another is white balance correction wherein the relative magnitudes of different pixels of the primary colors are set to represent white. This processing may also include de-mosaicing the individual pixel data to superimpose data from spatially separate monochromatic pixel detectors of the sensor to render superimposed multi-colored pixels in the image data. This de-mosaicing then makes it desirable to process the data to enhance and smooth edges of the image. Compensation of the image data for noise and variations of the camera optical system across the image and for variations among the sensor photodetectors may also be performed. Other processing typically includes one or more of gamma correction, contrast stretching, chrominance filtering and the like. The processed data are then usually compressed within the camera by use of a commercially available algorithm before storage in a non-volatile medium.

Image motion may also be taken into account in advance of taking the picture in order to optimize parameters of any artificial lighting, either alone or in conjunction with optimizing parameters of the exposure, in order to enhance the resulting image based on the amount of motion present. The amount of camera jitter is preferably determined by comparing data of two or more pre-capture images, typically having lower resolution than the final acquired image, rather than using a gyroscope or other mechanical camera motion detector, although such a motion detector may alternatively be used. The pre-capture images may also be used to determine an amount of motion of objects within the scene being photographed with respect to other objects in the scene.

Global and/or local motion of an image are used to optimize the timing, duration and level (strength) of flash illumination of a scene being captured. In addition, one or more, or even all, of the following measurements may be used in this optimization, not only to reduce or eliminate blur but to also improve other aspects of the quality of the captured image, particularly to make it appear more naturally illuminated:

(1) Global ambient illumination conditions;
(2) Local ambient illumination conditions;
(3) Background light level;
(4) Dynamic range (uniformity) of the ambient lighting across the scene being captured;
(5) Distance of an object of interest within the scene from the camera;
(6) Reflectivity of the object of interest; and
(7) Color of the object of interest.

Electronic Camera Example

Figure 1:
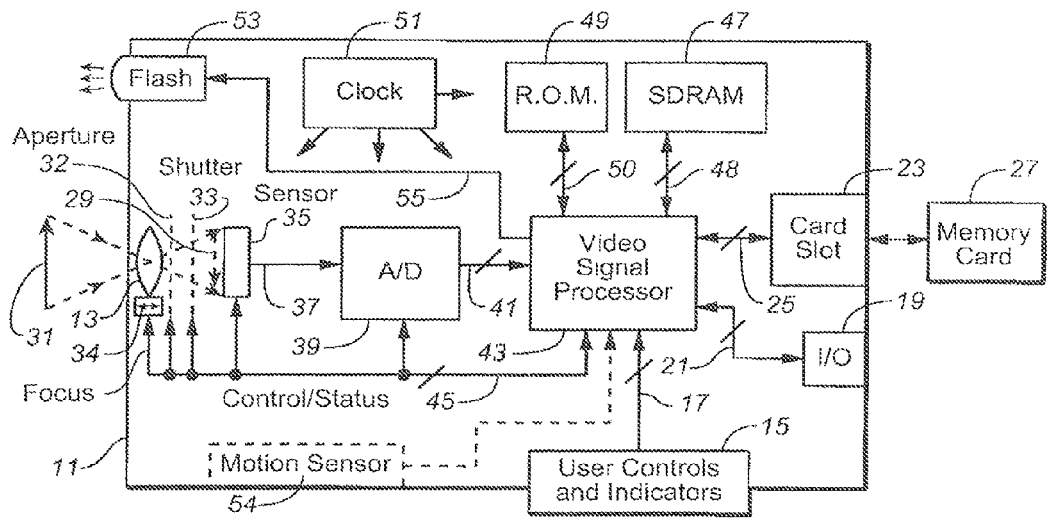
FIG. 1 illustrates a camera or other video acquisition device in which the exposure control techniques of the present invention may be implemented.

In FIG. 1, an example of a camera in which the present invention may be implemented is schematically shown, which may be a still camera or a video camera. It includes a case 11, an imaging optical system 13, user controls and indicators 15 that generate and receive control signals 17, a video input-output receptacle 19 with internal electrical connections 21, and a card slot 23, with internal electrical connections 25. A non-volatile memory card 27 is removably inserted into the card slot 23. Data of images captured by the camera may be stored on the memory card 27 or in an internal non-volatile memory (not shown). Image data may also be outputted to another video device through the receptacle 19. The memory card 27 can be a commercially available semiconductor flash memory, small removable rotating magnetic disk or other non-volatile memory to which video data can be written by the camera.

The optical system 13 can be a single lens, as shown, but will normally be a set of lenses. An image 29 of a scene 31 is formed in visible optical radiation through an aperture 32 and a shutter 33 onto a two-dimensional surface of an image sensor 35. A motive element 34 moves one or more elements of the optical system 13 to focus the image 29 on the sensor 35. An electrical output 37 of the sensor carries an analog signal resulting from scanning individual photo-detectors of the surface of the sensor 35 onto which the image 29 is projected. The sensor 35 typically contains a large number of individual photo-detectors arranged in a two-dimensional array of rows and columns to detect individual pixels of the image 29. Signals proportional to the intensity of light striking the individual photo-detectors are obtained in the output 37 in time sequence, typically by scanning them in a raster pattern, where the rows of photo-detectors are scanned one at a time from left to right, beginning at the top row, to generate a frame of video data from which the image 29 may be reconstructed. The analog signal 37 is applied to an analog-to-digital converter circuit chip 39 that generates digital data in circuits 41 of the image 29. Typically, the signal in circuits 41 is a sequence of individual words of digital data representing the intensity of light striking the individual photo-detectors of the sensor 35.

The photo-detectors of the sensor 35 typically detect the intensity of the image pixel striking them in one of two or more individual color components. Early sensors detect only two separate colors of the image. Detection of three primary colors, such as red, green and blue (RGB) components, is common. Currently, image sensors that detect more than three color components are becoming available.

Processing of the video data in circuits 41 and control of the camera operation are provided, in this embodiment, by a single integrated circuit chip 43 (which may also include the analog-to-digital converter instead of using the separate circuit chip 39). These functions may be implemented by several integrated circuit chips connected together but a single chip is preferred. In addition to being connected with the circuits 17, 21, 25 and 41, the circuit chip 43 is connected to control and status lines 45. The lines 45 are, in turn, connected with the aperture 32, shutter 33, focus actuator 34, sensor 29, analog-to-digital converter 39 and other components of the camera to provide synchronous operation of them. Signals in the lines 45 from the processor 43 drive the focus actuator 34 and set the size of the opening of the aperture 32, as well as operate the shutter 33. The gain of the analog signal path is also set by the processor 43 through the lines 45. This gain typically takes place in the analog-to-digital converter which, in the case of a CCD sensor, is part of the sensor, or in the case of a CMOS sensor, is part of a separate analog-to-digital converter as shown in FIG. 1.

A separate volatile random-access memory circuit chip 47 is also connected to the processor chip 43 through lines 48 for temporary data storage. Also, a separate non-volatile memory chip 49 is connected to the processor chip 43 through lines 50 for storage of the processor program, calibration data and the like. The memory 49 may be flash memory, which is re-programmable, or a memory that is programmable only once, such as a masked programmable read-only-memory (PROM) or an electrically programmable read-only-memory (EPROM). A usual clock circuit 51 is provided within the camera for providing clock signals to the circuit chips and other components. Rather than a separate component, the clock circuit for the system may alternatively be included on the processor chip 43.

A source 53 of artificial illumination, such as a flash lamp or other source of light pulses, is preferably built into the camera case 11. The source 53 operates in response to control signals from the processor 43 through control lines 55. The source 53 is chosen to be a type that emits light pulses whose intensity and/or duration are controllable, and preferably both. Certain types of flash lamps currently used in cameras, such as xenon flash lamps, have a limited adjustability of pulse intensity and duration but other sources of light suitable for use in cameras, such white light-emitting-diodes (LEDs), are more continuously controllable. The processor 43 preferably controls the timing, intensity and duration of a light pulse output of the light source 53. Use of this control capability to minimize effects of camera and/or image motion when acquiring data of an image is described below.

Multiple illumination sources may alternatively be installed in the camera, pointing in different directions for the purpose of more uniformly illuminating an image filed over a wider field of view. All of the one or more light sources installed in a camera are preferably controlled by the processor 43. As a further alternative, one or more light sources may be located outside of the camera case 11 but it is certainly easier to control the effect of illumination source(s) that have a fixed physical relationship with the camera optics.

A motion sensor 54 may also be included within the camera housing 11, its output connected to provide a signal to the processor 43 that is proportional to any motion of the camera relative to the scene that occurs during the capture of data of an image of the scene. Camera jitter often occurs during the taking of pictures with a hand held camera. The motion sensor 54 may be a gyroscope, accelerometer or some other mechanical device that provides an electrical output proportional to the magnitude and direction of motion of the camera. Some commercially available cameras include such a device. However, as described hereinafter, it is preferred to measure camera motion from data of preview images acquired prior to taking the picture. This also allows characteristics of any motion within the scene, such as movement of a person or other object across the scene, to be determined. A mechanical sensor within the camera cannot provide this.

Figure 2:
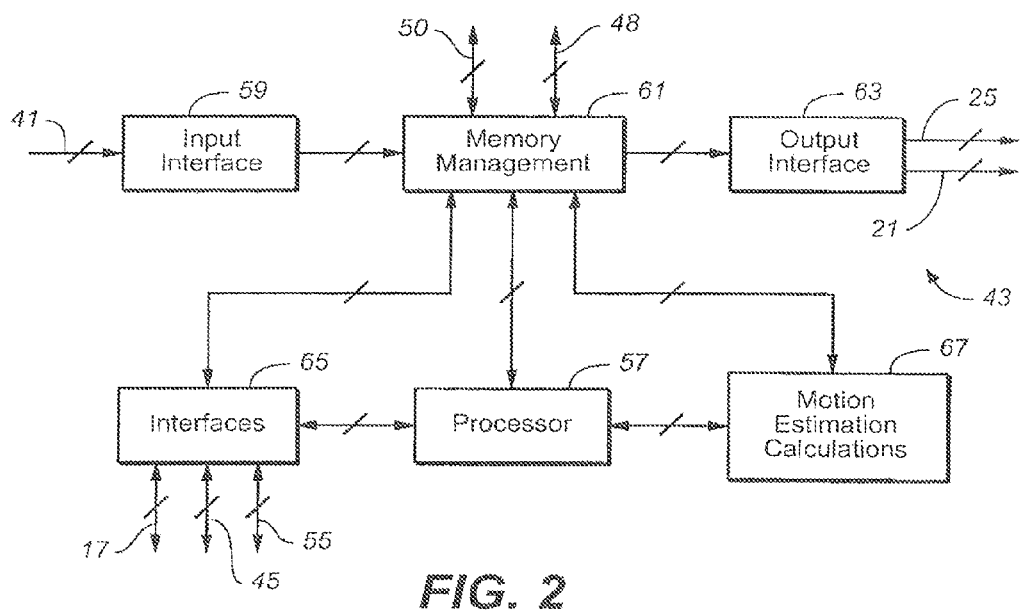
FIG. 2 is a block diagram of some of the functional components of the video signal processor of the device of FIG. 1.

A general block diagram of the processor chip 43, including portions that calculate and estimate motion, is given in FIG. 2. A processor 57, which may be general purpose or dedicated to the tasks herein, performs calculations on the image data and controls operation of the camera, in response to firmware stored in the flash memory 49 (FIG. 1). Digital data of successive image frames are received over lines 41 by an interface circuit 59 through input contacts on the chip 43, and are then communicated with other system components by connection through a memory management unit 61. Video data of captured image frames are outputted through an interface circuit 63 to lines 21 (to the input-output receptacle 19 of FIG. 1) and 25 (to the flash memory card slot 23 of FIG. 1) that are connected to output contacts on the chip 43. Interface circuits 65 communicate between the lines 17, 45 and 55 (see FIG. 1) and the processor 57 and the memory management unit 61.

Circuits 67 of FIG. 2, also connected with the processor 57 and memory management unit 61, are optionally included to perform at least some of the repetitive specialized calculations necessary to implement the processes described herein, such as to estimate motion of the image from data of successive image frames. This is usually more efficient than employing the processor 57 to make the calculations under control of the firmware but such calculations could alternatively be made by the processor.

Calculating Exposure Parameters

Figure 3:
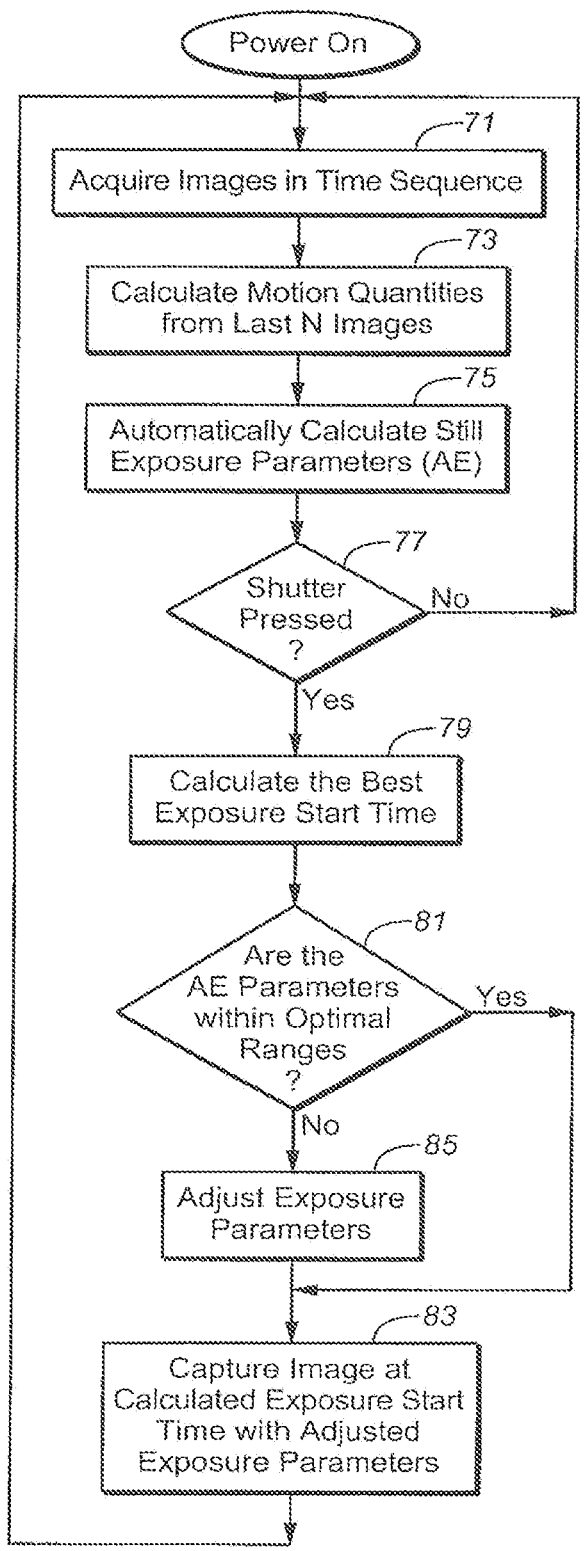
FIG. 3 is a flow chart showing a process of calculating and using exposure parameters that takes image motion into account.

FIG. 3 is a flowchart that illustrates an example of a process implemented within a camera such as illustrated in FIGS. 1 and 2 to calculate exposure parameters for use in acquiring data of an image. Any artificial illumination of the scene whose images are being captured is not controlled in the process illustrated in FIG. 3.

Once the camera is turned on by the user, it repetitively acquires data of images, as indicated by a step 71, at many frames per second, which can be as high as 30 or more. In the usual camera, these pre-capture images are displayed in sequence on the camera's LCD display with a reduced resolution, as a preview of an image that the camera would capture when its shutter button is pushed but they need not be displayed. Two other calculation functions 73 and 75 are performed each time data of a new pre-capture image are acquired. This processing is continuous while the camera is being used. When it is detected that the camera user has depressed the shutter button to take a picture, as indicated by a step 77, the quantities and parameters calculated in steps 73 and 75 are ready for use in setting the camera up to quickly take the picture. Alternatively, however, the calculations 73 and 75 could be made after the step 77 has detected depression of the shutter button.

In the step 73, data of N number of pre-capture images are used to calculate motion quantities for use in setting the exposure parameters, where N equals two or more, and can be five or more. As explained in detail below, any change in motion of the scene image relative to the camera's photosensor is detected and quantified by looking at changes in successive pre-capture images, both globally (movement of the entire image) and locally (local movement within the image). Vectors of motion, velocity and acceleration are preferably calculated from data of N pre-capture images, thereby allowing a prediction to be made of the future location of the scene image, or a portion of it, on the photosensor.

In the step 75, exposure parameters are calculated by existing techniques, without regard to any image motion, in order to maintain the average luminescence across the image within a predefined range. The average luminescence can be measured from a pre-capture image. The time duration of the exposure and one or more other exposure parameters are calculated in this step. The other exposure parameters typically include the size of the aperture opening and gain. However, although these parameters are used directly to set current cameras to take a picture, they are treated in the camera operation shown in FIG. 3 as preliminary, subject to modification by the results of the motion calculations 73.

Once depression of the shutter button is detected by the step 77, the picture could be taken as soon thereafter as possible. However, it is preferred to first look at the motion quantities calculated in the step 73. Taking of the picture may then be postponed for a time until any motion of the image is expected to be minimal, in order to minimize any motion blur in the resulting image. Therefore, in a step 79, the optimum instant to take the picture is estimated from the motion quantities calculated in step 73. This estimate is made by extrapolating the motion quantities calculated from the pre-capture images in the step 73, and then identifying either zero or minimal motion within a set period. It is at that instant that the picture is scheduled to be taken. If, however, a zero or minimal motion point cannot be detected with high precision, due to the complexity of the motion, or if the user has chosen to turn off the delayed capturing option, or if the motion quantities show that there is little or no motion of the image, then the time for taking the picture is not postponed and capture of the image is executed right away.

A next step 81 determines whether the exposure parameters automatically calculated in the step 75 are such that the motion quantities will not cause them to be altered. For example, if the exposure duration (shutter speed) is set by the step 75 to be below a certain threshold, then no further decrease of the exposure time to reduce motion blur should be done. And if the aperture and gain are also set by the step 75 to be smaller than corresponding thresholds, then it is not necessary to consider whether motion in the image is small enough to allow the shutter speed to be increased in order to lower them to improve depth of field or reduce noise. In such a case, which occurs for example, in a very brightly illuminated scene, the processing proceeds to a step 83 where the picture is taken with the exposure parameters set by the step 75. The motion quantities calculated in the step 73 are not used or even referenced. Nor is the calculation of step 79 of the time to take the picture necessary; the picture can be taken right away.

However, in most situations the scene is not so brightly illuminated. Therefore, when the preliminary parameters calculated by the step 75 are not within optimum ranges, they are adjusted by a step 85 in order to optimize them for the amount of motion that was calculated by the step 73. Generally, if that motion is high, the exposure time is reduced, with a corresponding increase in the size of the aperture and/or increase in the gain in order to maintain the same average image signal luminescence. This reduces motion blur, but the depth of field generally will decrease and/or the noise of the image may increase. But this tradeoff will almost always be preferred to acquiring an image with motion blur.

On the other hand, if the calculated motion is low or zero, the exposure time may be increased, with the benefit that the size of the aperture and/or the gain may be decreased. This provides an image with a greater depth of field, less optical blur and less noise. Without having the calculated motion quantities, it would be risky to adjust the preliminary parameters calculated by the step 75 in this way since it could result in increased motion blur in the image when motion is present.

Figure 4:
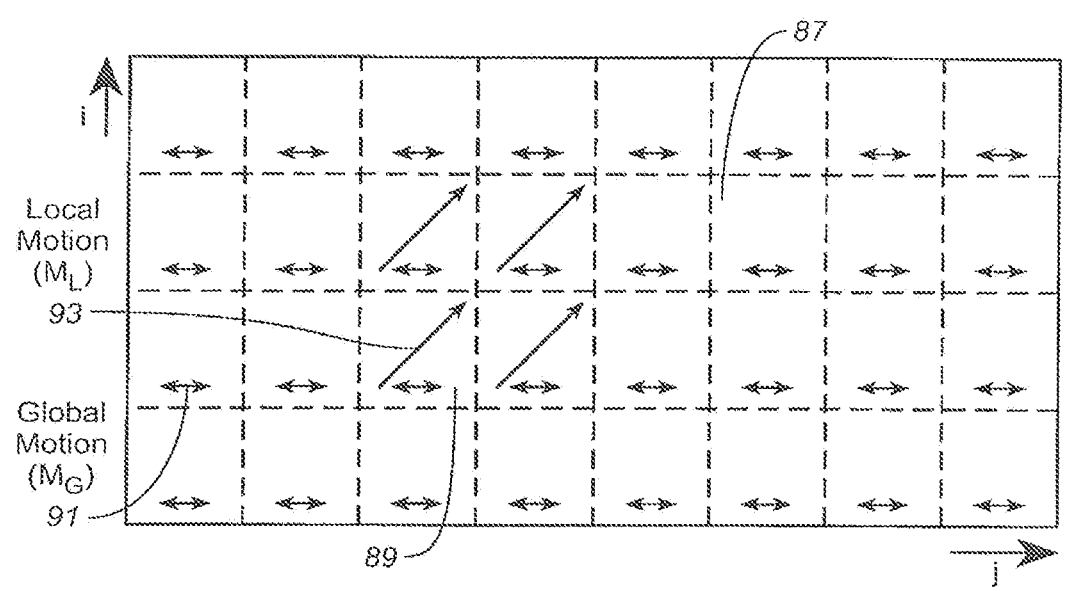
FIG. 4 represents an image frame with exemplary camera and scene motion vectors added to individual blocks of pixels.

FIG. 4 conceptually shows a single image with its pixels grouped into blocks of multiple pixels each, such as blocks 87 (represented by the i, j coordinates 3,6) and 89 (2,3). Motions of the scene being photographed relative to the camera image frame are indicated. An example image is illustrated to have a global motion vector $M_G$ indicated by arrows 91 in each of the blocks of pixels. This motion would result from camera shake, back-and-forth in a horizontal direction. Of course, other camera motion would be illustrated by different patterns. If the motion is up-and-down, for example, the global motion arrows would be shown vertically. If the camera motion follows a circular or elliptical pattern, two other possibilities, the motion would be shown by a circle or ellipse, respectively.

The magnitude and direction of global motion is calculated from data of N pre-capture images, preferably by the circuits 63 (FIG. 2), by detecting and quantifying overall movement between the pre-capture images. An example of a specific technique for calculating global motion is given in U.S. patent application Ser. No. 10/897,186, filed by Pinto et al. on Jul. 21, 2004. Alternatively, a mechanical motion sensor can be included in the camera for the purpose of providing a signal of the global motion but is not preferred.

In the example of FIG. 4, a portion of the image is shown to have additional local motion vectors $M_L$, in this case for four of the blocks, which are independent of any camera shake or other global motion. This represents motion of that small part of the scene being photographed relative to the rest of the scene and to the person holding the camera. The resulting motion within the image is in the direction of the arrows and with a relative velocity represented by the length of the arrows. Such motion can be from the movement of a person in the scene, vehicle motion, the action of wind on a tree, or from numerous other movements in scenes that are photographed. Algorithms for the calculation of motion within an image of between a sequence of images are known. An example is described in the above-identified U.S. patent application Ser. No. 10/897,186. Motion vectors can be calculated in a manner that is similar to the calculation of motion vectors used by known video compression algorithms, examples being those of the Moving Picture Experts Group, the most recent being MPEG-4.

By one motion calculation technique, vectors of motion, velocity and acceleration are calculated for each of the blocks of pixels of the image. These quantities give the motion of each block and allow its future location, speed and direction to be estimated. If a large object moves across the scene, for instance, then the blocks representing the object have motion vectors that point in the direction of the movement. If the image motion is due to camera shake only, the block motion vectors of all or most of a scene generally point in the same direction. The local motion vectors $M_L$ of this description are these individual block motion vectors after the global motion vector $M_G$ has been subtracted, so the vectors $M_L$ provide an indication of only local motion within the image of the scene. The vectors $M_L$ and $M_G$ are to that extent independent of each other.

Curves of FIGS. 5A-5D provide an example of absolute values of local and global velocity vectors as a function of time, and combinations of them, in order to further describe the calculations of steps 73 and 79 (FIG. 3). FIG. 5A shows the global motion represented by the arrows 91 of FIG. 4. In this example, a back-and-forth motion of a camera is represented, having a zero speed (absolute velocity) at one extreme of its motion, a zero speed at the other end of its motion, and an increasing-decreasing speed function in between. FIG. 5C shows an example of the magnitude of local motion vector 93 of the pixel block 89 of FIG. 4. For illustrative purposes, this motion is shown to increase from zero to a maximum and then decrease during the pre-capture images. FIG. 5B shows the absolute value of a total motion vector $M_{T(2,3)}$ for only the pixel block 89. This is an arithmetic combination of the magnitudes of the curves of FIGS. 5A and 5C.

FIG. 5D shows an example of the total motion quantity $M_T$ for the entire image frame. The motion calculations result in one value of $M_T$ for each pre-capture image frame, and this is not a vector. It is the primary quantity used in the steps 79 and 85 (FIG. 3) to determine an exposure time and adjust the exposure parameters. Indeed, the quantities $M_T$ for a number of successive pre-capture images are used when it is desired to estimate a better time for the exposure. For these purposes, it is a combination of the global motion of FIG. 5A and a weighted average of the local motion quantities of the individual pixel blocks within the image. An equation for calculating $M_T$ of an image frame is given in FIG. 5D. The weight W of an individual pixel block (i,j) can be made to depend on its location within the image frame or on its relative luminance with respect to the rest of the image. The weight W may be a function of the distance of the block from the center of the image frame. Therefore, the total motion $M_T$ for an image depends on the number of blocks having local motion, the magnitude of that local motion and the relative position of the blocks with motion within the image. Further, the global motion $M_G$ may be multiplied by a constant k, as shown in the equation of FIG. 5D, to allow different weights to be given to the global velocity and the average of local velocities. If k is more than one, the global motion is weighted more and if less than one the local motion carries the greater weight. The overall total motion curve of FIG. 5D is similar to the total motion curve of FIG. 5B for a single pixel block, but lower in magnitude because the local motion of most pixel blocks of the image frame of FIG. 4 that are included in the average is zero.

In the example of FIGS. 5A-5D, data for pre-capture images are being acquired in the period before time t1. If the step 79 (FIG. 3) is being implemented, then the motion after acquiring the last pre-capture image at time t1 is estimated from data of the pre-capture images, as shown dashed in FIGS. 5A-5D. The motion detected from the pre-capture images is extrapolated into the future. A period t1-t3 is preferably defined in which the minimum motion is sought to be identified. The total motion (FIG. 5D) is, in this example, the quantity for which minimum motion is sought, and that total motion is zero at time t2. So that at time t2, the effects of motion on the picture being taken are estimated to be minimized, so this instant is selected to capture the image. Of course, actual motion functions can be more complicated than those illustrated in FIGS. 5A-5D, in which case a minimum value of $M_T$ is sought within the time period t1-t3.

As an alternative to making exposure adjustments based on the total motion of the scene relative to the camera image frame, the local motion of only a portion of the scene may be used. For example, the camera may be provided with a fixed or user definable outline, such as a rectangle, that can be positioned to surround a portion of the image for which motion compensation is primarily desired. In the example of FIG. 4, the user could surround image blocks $M_{L(2,3)}$, $M_{L(3,3)}$, $M_{L(3,4)}$, and $M_{L(2,4)}$ with such an outline. This portion of the image could be an object that is moving relative to other portions of the scene, such as a vehicle or a person. The processing then calculates a single local motion quantity, such as an average of the vector magnitudes for these blocks, and this quantity is then used to minimize blurring of such an object within the scene. To accomplish this, the local motion quantity is used in place of the total motion to determine the time to capture the image and/or to adjust the exposure parameters. The local motion of the outlined portion of the scene is thus taken into account while motion of other parts of the scene are not.

Figure 6A:
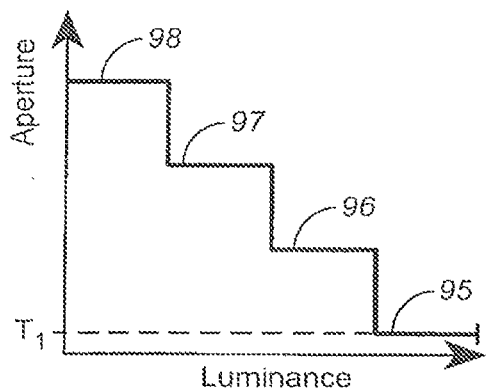
FIGS. 6A-6C show an example of automatic camera exposure parameters as a function of the luminance of the captured image.
Figure 6B:
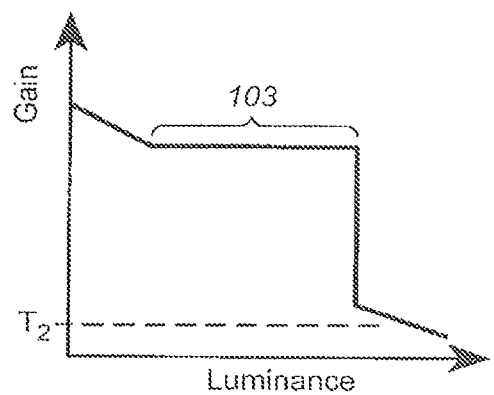
Figure 6C:
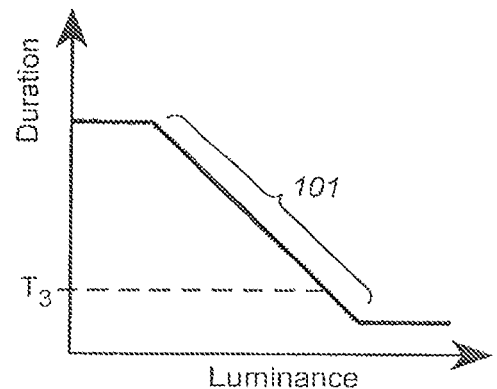

FIGS. 6A, 6B and 6C help to illustrate the automatic exposure calculation 75 (FIG. 3) and the choice that is made in the step 81 based upon these calculations. A digital camera, for example, often has only several discrete levels of aperture opening from which a selection is made to take a picture. Aperture openings 95-98 are shown in FIG. 6A. For each of these levels, there is a gain function such as illustrated in FIG. 6B and an exposure time (duration) function such as illustrated in FIG. 6C. A sloping portion 101 of the exposure duration curve (FIG. 6C) extends between the same luminescent levels as a flat portion 103 or the gain curve (FIG. 6B). The automatic exposure (AE) calculation of preliminary exposure parameters is accomplished by choosing a combination of aperture, gain and duration that provides an average output signal of the photosensor for an image that is within a predetermined range for a wide variety of illumination levels of the scene being photographed. The average luminescence of the image is maintained within boundaries. These calculations, made without benefit of image motion information, balances the desire for a short exposure time in case there is significant image motion against the desires of a deep field of view and low optical blur (small aperture opening) and low noise (low gain). Some level of image motion is necessarily assumed in the calculation of the parameters but no information of any particular image motion is used. It is in the step 85, that these preliminary parameters are adjusted for image motion if such an adjustment will likely improve the quality of the image.

The step 81 (FIG. 3), in this example, initially determines whether the calculated automatic exposure quantities are all below levels $T_1$, $T_2$ and $T_3$ of FIGS. 6A-6C. If so, as previously discussed, there is no need to consider the motion calculations. This is because adjustment of the exposure parameters cannot significantly improve image quality. Since the exposure time is nearly as small as possible, any motion blur cannot be significantly reduced. In addition, there is no prospect of improving the depth of field or noise in the image by increasing the exposure time since a compensating decrease in the aperture opening and gain are not possible; they are already about as low as the camera allows.

Figure 7:
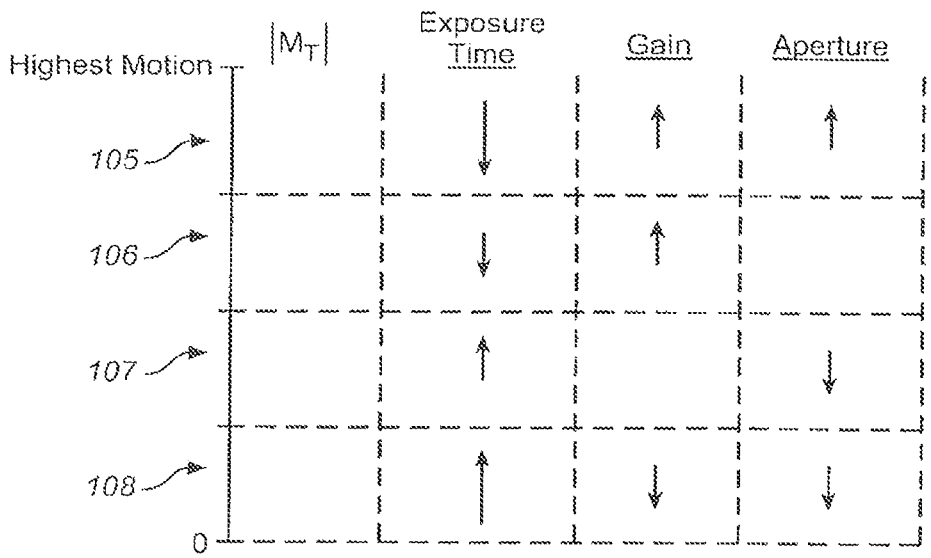
FIG. 7 illustrates a specific example of adjustments of the automatic camera exposure parameters for different levels of motion.

FIG. 7 illustrates an example of step 85 of FIG. 3 for adjusting the preliminary parameters in response to the motion calculations of the step 73. For simplicity, there are four different sets 105-108 of adjustments, depending upon the absolute magnitude of the total motion MT at the expected time of exposure. For the highest level 105, the exposure time is decreased significantly and one-half the image luminescence lost, but that is restored by increasing the gain and the other one-half by increasing the aperture opening. In the next level 106, with lesser motion, the exposure time is reduced by a smaller amount and the lost image luminescence restored by increasing either the gain or the aperture. If there is little or no motion, the level 108, the exposure time may be increased and the extra luminescence is reduced by reducing the gain and the aperture opening, both with beneficial results on the captured image. If there is some small amount of motion, the level 107, the exposure time is increased a smaller amount and either the gain or the aperture opening is reduced to restore the image signal to about the original level of luminescence.

In the examples of gain adjustment given above, the gain level of the analog signal is adjusted before digitizing the signal and this adjusted level is then used during capture of the image. In addition to this, or in place of it, the gain of an image may be adjusted in the digital domain after data of the image have been captured and digitized. For example, the digital gain adjustment can be performed after the data have been captured in the camera's internal memory, as part of image processing or enhancement stage, but before compressing the data and writing it to a removable non-volatile memory. Although digital gain increase usually results in a noisier image than analog gain increase, it may be convenient to control the digital gain as well. The amount of digital gain that is required may be determined during the process that adjusts the exposure parameters in advance of image capture, as part of calculating the exposure time, aperture and perhaps analog gain, but then applied to the digital data of the image after it has already been captured. Alternatively, or in addition, the gain level of the image may be determined and adjusted as part of the post-processing or enhancement of the captured image data and applied thereafter in that stage.

The parameter adjustment example of FIG. 7 shows several motion thresholds between the sets 105-108 of adjustments. For any motion above the threshold between the sets 106 and 107, the parameters are individually adjusted in a single direction, and when the motion is below that threshold, the parameters are adjusted in the opposite direction. As a variation of this single threshold, two motion thresholds can be defined. When the motion is above the higher of the two thresholds, the parameters are individually adjusted in one direction and individually adjusted in the opposite direction when below the lowest threshold. For motion values between the thresholds, no adjustment of the preliminary parameters would be made.

Control of Artificial Illumination

In the above-discussion, the exposure parameters are calculated and utilized to capture data of images of scenes without regard to whether the scenes are illuminated by artificial light. Those techniques apply primarily to situations where the scenes are illuminated by ambient light. Sources of ambient light include sunlight, daylight, general interior building lighting, outdoor street lamps, and the like. But when an artificial light pulse is used to illuminate a scene, usually in addition to some level of ambient lighting, parameters of the light pulse may also be controlled by any camera jitter or motion found to exist within the scene. Such parameters include the intensity and duration of the flash light pulse and its timing. At least one of these parameters is controlled to reduce or eliminate blur in the image due to image motion.

Figure 8:
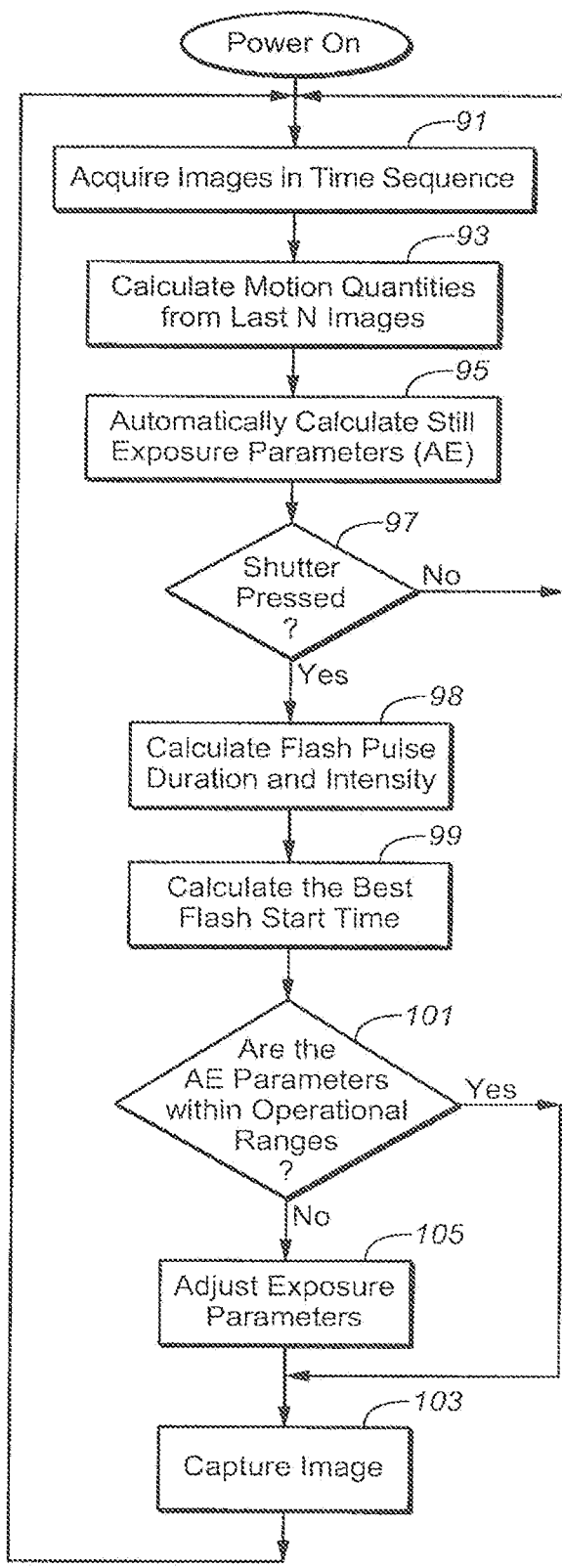
FIG. 8 is a flow chart showing a process of calculating and using flash light parameters that takes image motion into account.

The flow chart of FIG. 8 illustrates an embodiment of such flash light control. The process is similar to that shown in FIG. 3 for calculating and using exposure parameters on the basis of image motion, but additionally calculates and uses parameters of artificial flash lamp illumination on the basis of image motion. Indeed, if there is sufficient ambient light illuminating the scene, steps 91 and 93 of FIG. 8 can be the same as respective steps 71 and 73 of FIG. 3, providing data of motion from data of two or more preview images of the scene. However, if insufficient ambient light is falling on the scene to allow the accurate measurement of scene motion, the motion present in the scene may be measured in the step 93 while the scene is illuminated with two or more short flash light pulses, during respective two or more exposures that acquire data of two or more preview images, as would be produced by a standard gas discharge, for example a xenon, flash lamp. Or if more continuously illuminated by a highly controllable illumination source, such as one or more high brightness white, or other color, LEDs, a single long pulse may be used that extends over both of the preview image exposures. Indeed, the duration of the LED light pulse can be further increased to extend over acquisition of data of both the preview images and subsequently of the image of interest. Alternatively, separate pulses can be emitted from the LED during acquisition of one or more of these images, in order to save power. In any of these cases, this "pre-flash" provides the necessary illumination to accurately measure local motion of objects in the scene and/or global motion of the entire scene. In a step 95, the AE exposure parameters are calculated in the same manner as described for the step 75 of FIG. 3, from pre-capture images acquired when the scene is illuminated with ambient light, combined with motion vector information obtained while the scene is illuminated by "pre-flash" light.

In the process of FIG. 8, the desirability of using flash light for the capture of the final image is determined by a technique not shown. Typically, the use of flash light is in response to either the average luminance of the scene, illuminated with ambient light, being so low that the duration, aperture and/or gain required for a good exposure exceeds what the camera can provide. Sometimes flash is chosen because the luminance of some selected local portion of the image, containing an object of interest, is below a set level, as would be the case if back lighting on a scene causes foreground areas of the scene to be in deep shadow, and therefore too weakly illuminated to allow the capture of for example, facial details of a wife or child. Indeed, the object of interest may be an object with local motion such as an individual moving across the scene, an automobile racing within the scene, etc.

After the shutter is detected to have been pressed, in a step 97, the duration and intensity of the flash pulse desired to be emitted during capture of the image are calculated, in a step 98. The pulse duration is determined primarily by the image motion quantities calculated in the step 93. The pulse duration is selected to be short enough so that any blur caused by motion of any part of or the entire image across the photodetector during the duration of the pulse will be zero or less than some acceptable level. The intensity of the flash pulse then needs to be adjusted so that the scene receives enough light energy to operate within a set of exposure parameters that are possible for the particular camera or other digital image acquisition device. The initial set of exposure parameters calculated in the step 95 may be adjusted in a later step 105 to adjust for the effect of the calculated flash pulse.

After the flash pulse and intensity are determined, a next step 99 determines the best time to initiate the pulse. This is done in the same manner as the calculation 79 of FIG. 3. The flash is preferably initiated at a time when the image motion calculated in the step 93 is expected to be zero or at least a minimum within a short time interval after the start time calculation being made.

In a step 101, it is determined whether the initial exposure parameters calculated in the step 95 need to be changed after the flash light pulse, with characteristics determined by the step 98, has been added. If not, data of the image are captured in a step 103 with these initial exposure parameters and a flash light pulse generated with the duration and intensity calculated in the step 98. But if a change in one or more exposure parameters is required, this is done in a step 105 before the image is captured in the step 103. One change that may be necessary is to adjust the duration of the exposure that was calculated in step 95, as artificial light is to be added to the scene, due to activation of the flash light pulse. The exposure duration would then be typically decreased, as the overall scene is to be more illuminated, hence the blur effect would be additionally reduced. Changes in the initially calculated aperture and sensor gain may also be necessary in the step 105 to accommodate the increased luminance of the scene caused by the flash light pulse and/or any increase in the exposure duration. For instance, sensor gain may be decreased to reduce overall image noise, or alternatively increased to increase image brightness.

Any such exposure parameter adjustments are made in the step 105 without taking into account any of the image motion quantities calculated in the step 93. Any image motion is compensated in the embodiment of FIG. 8 by control of the flash light in order to reduce or eliminate blur in the resulting image that is captured.

Figure 9:
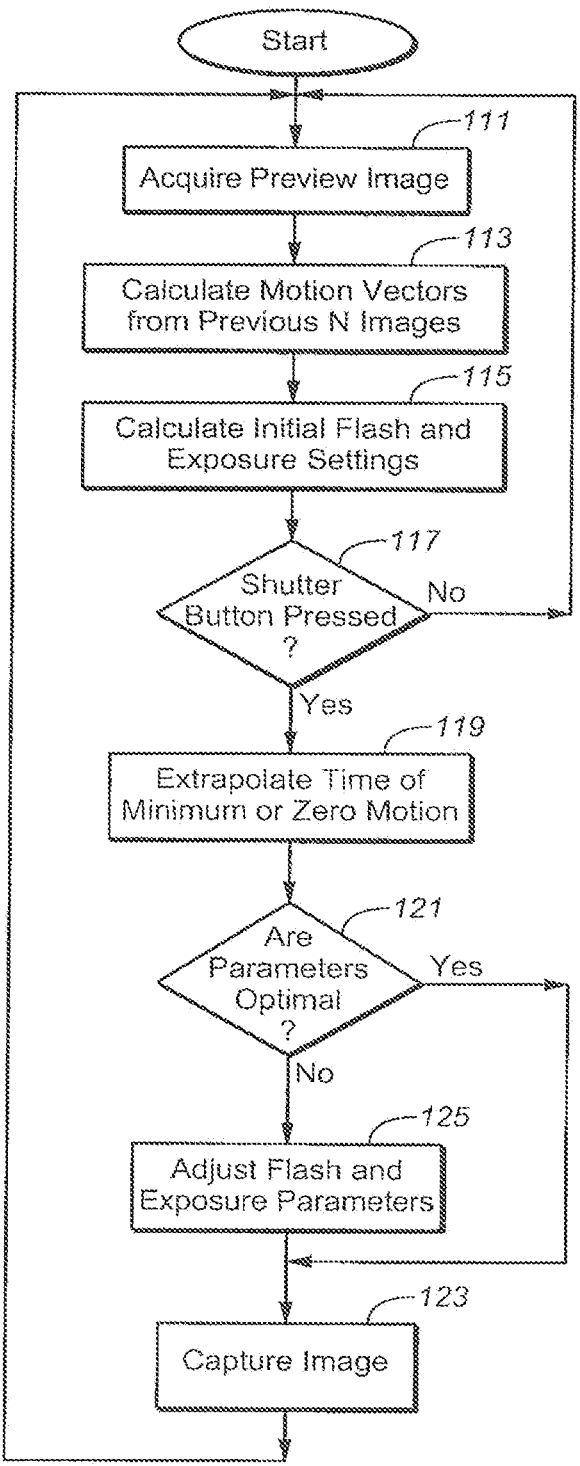
FIG. 9 is a flow chart showing a process of calculating and using exposure and flash light parameters that take image motion into account.

In another embodiment illustrated by the flowchart of FIG. 9, however, each of the flash light and exposure parameters are calculated from the motion that is forecasted to occur during exposure. Initial steps 111 and 113 are again essentially the same as the steps 71 and 73, respectively, of the embodiment of FIG. 3. But in a step 115, initial parameters of exposure and flash are calculated according to current known algorithms used in cameras, without regard to any motion in the image.

Once it is detected that the camera user has actuated the shutter button, in a step 117 of FIG. 9, the histories of the motion vectors calculated in the step 113 are used to predict a time of zero or minimum motion within an allowed time horizon. It is at this time that the concurrent exposure and flash light pulse preferably occur. This is essentially the same as the step 79 of the embodiment of FIG. 3, determined in the manner illustrated in FIGS. 5A-5D.

A next step 119 determines whether the initial exposure and flash light parameters calculated in the step 115 are optimal in view of image motion calculated in the step 113 and the time of initiation of exposure and flash determined by the step 119. If so, data of the image are captured in a step 123 with the set exposure and flash light pulse parameters calculated in the step 115 being used. However, if the initially determined exposure and/or flash durations are so long with respect to the amount of motion present that an unacceptable amount of blurring will occur in the image, or if the aperture or sensor gain are above acceptable thresholds, modifications are taken in a step 125 to the exposure and/or flash light parameters calculated in the step 115. Data of the image are then captured in the step 123.

Figure 10:
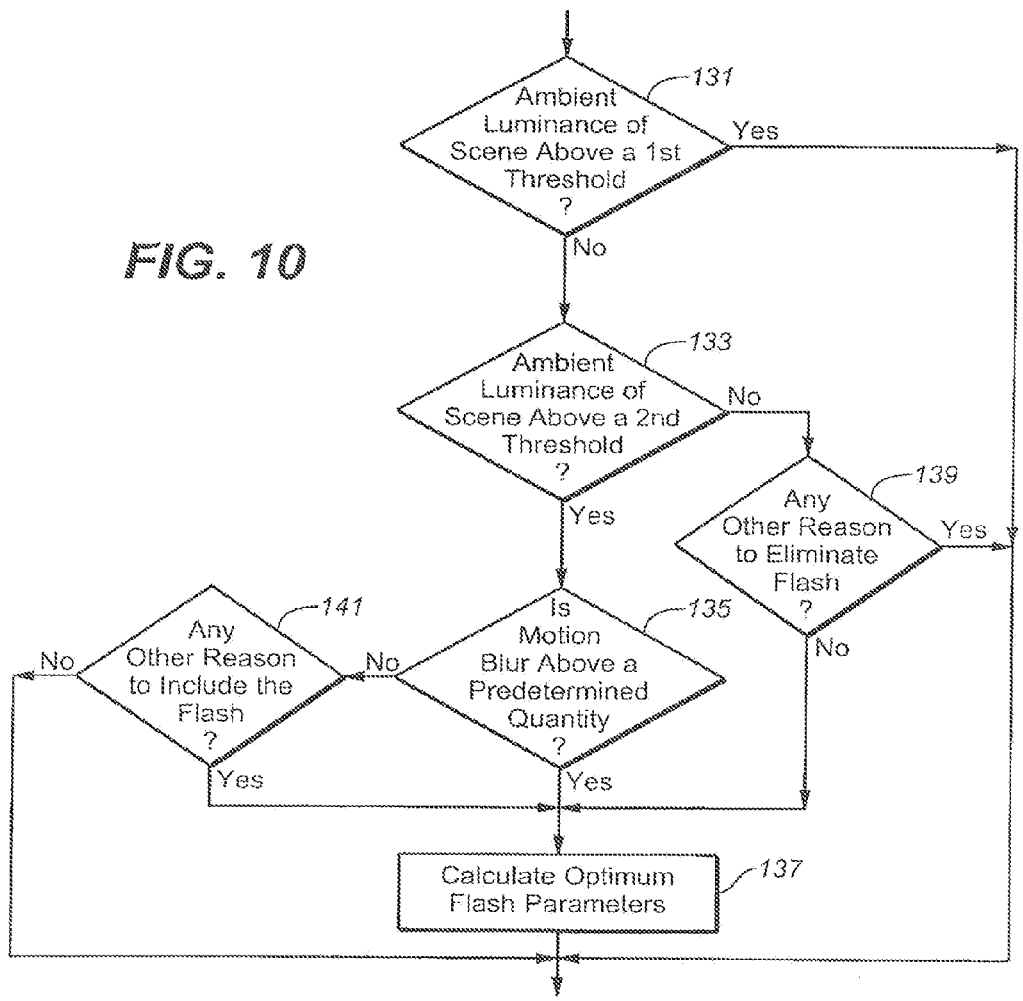
FIG. 10 is a flow chart showing another process of calculating and using exposure and flash light parameters that take image motion into account.

The flow chart of FIG. 10 illustrates a more detailed embodiment of artificial illumination control. The process there shown is inserted within the flowchart of FIG. 3 in a convenient place, such as between the steps 77 and 79. The combination controls parameters of both the exposure and a flash light pulse. If flash light is enabled by this added process, then the adjustment in the step 85 (FIG. 3) of the exposure parameters includes making adjustments for the parameters of this added illumination.

A first step 131 of the sub-routine of FIG. 10 determines whether the luminance of the scene is above a first preset threshold. This is a high value, detected when the exposure duration, aperture and sensor gain calculated in the step 75 are all below predetermined thresholds. If so, no flash is activated and the exposure parameters are calculated without consideration of any artificial illumination. Any motion in the image is not taken into account since the exposure duration is already as short as possible and flash illumination of an already brightly illuminated scene will have little effect. If below such a threshold, however, the process then proceeds to a step 133.

In the step 133, it is determined whether the ambient illumination of the scene is above a second preset threshold that is below the first preset threshold. The second threshold is established to identify scenes with ambient illumination of at least a medium level that is high enough to usually enable image capture without artificial illumination. At the same time, the second threshold is set so that scenes with ambient illumination below it usually results in one or more of the exposure parameters to be calculated outside of its operating range and as a result requires artificial illumination of the scene in order to acquire a good image. Therefore, when the scene ambient illumination is greater than the second threshold, the processing proceeds to a step 135 that takes image motion into account when determining whether to utilize a flash or not. When below the second threshold, however, the process proceeds to a step 137 wherein a flash will be used unless, as indicated by the presence of an intermediate step 139, there is some reason not to do so. One reason not to utilize a flash in this low ambient light situation is the desire of the camera operator to create an image that looks natural. That is, it is desired that the image not exhibit a rapid decrease in illumination in the depth direction of the scene being photographed because it can cause an image to be overly bright for objects close to the camera and very dark for objects far away from the camera.

In the step 135 of FIG. 10, it is determined from the calculations of the step 73 (FIG. 3) whether a relevant one or more quantities of motion of the image exceed a predetermined quantity. If so, this indicates that the image captured without flash will contain a significant motion blur, and the process proceeds to the step 137 to enable the flash. In the step 137, the parameters of duration, strength and timing of a flash light pulse are calculated in the same manner as described above for the step 98 of FIG. 8, and the flash is enabled to operate with these parameters. But if, in the step 135, it is determined that no quantity of image motion exceeds the predetermined amount, the flash is usually not used. In this case, there is enough ambient illumination of the scene that the exposure parameters may be set to eliminate or satisfactorily reduce the amount of image blur that may result from the small amount of image motion. The step 137 is then bypassed since the flash is not to be used. But if there is some other reason to use a flash, as determined by an intermediate step 141, then the step 137 is included and the flash used.

One reason to use a flash when there is enough ambient illumination, and include the step 137, is the desire of the camera operator to create an image that exhibits a greater dynamic range, lower noise level and/or greater depth of focus than can be obtained when the picture is captured with ambient lighting alone, even though adequate illumination is available for use of a relatively short exposure duration to sufficiently freeze the motion of the object of interest in the scene being photographed. This scenario is chosen especially if a highly controllable illumination source is employed, such as one or more high brightness white LEDs. In this case, the illumination pulse length can easily be made to exceed a shutter controlled exposure duration that is short enough to adequately freeze the motion in the scene but significantly longer than the pulse length of a conventional gas discharge flash light. Thus, the light of the image falling on the sensor is integrated over a longer period of time, allowing both ambient lighting and flash lighting to contribute to the quality of the captured image. By using a smaller aperture and lower gain level setting than can be employed by using only ambient lighting, a motion artifact is reduced and the captured image is more natural looking with a greater depth of focus and lower noise.

If it is determined in the step 135 that the motion blur will be in excess of a set amount, parameters for the flash are calculated in the step 137 and the flash enabled for use to capture data of the image. These parameters are calculated on the basis of the motion quantities calculated in the step 73 in order to eliminate or substantially reduce the motion blur that would otherwise exist.

In summary, the combined processes of FIGS. 3 and 10 are effective in reducing the amount of blur in an image of a scene that is moving, in total or partially, with respect to the camera photosensor, as well as providing for other image improvements by dynamically responding to lighting and motion conditions of the scene.

CONCLUSION

Although the various aspects of the present invention have been described with respect to exemplary embodiments thereof, it will be understood that the present invention is entitled to protection within the full scope of the appended claims.

It is claimed:

1. A method, comprising:
receiving a plurality of pre-capture images from one or more photo-sensors; and
employing one or more circuit components to perform actions, including:
using at least some of the pre-capture images to determine a magnitude of image motion and acceleration, including a local acceleration, of at least some of the pre-capture images; and
determining a time to initiate capture of an other image based on the determined magnitude of image motion and at least local acceleration.

2. The method of claim 1, wherein the image motion and acceleration are determined for each of a plurality of blocks of pixels of the pre-capture images.

3. The method of claim 1, further comprising:
determining at least one exposure parameter from at least the determined magnitude of image motion; and
further employing the at least one exposure parameter to capture the other image.

4. The method of claim 1, further comprising:
determining at least one illumination parameter of the scene, based in part on artificial lightning of the scene, and from at least the determined magnitude of image motion; and
further employing the at least one illumination parameter to capture the other image.

5. The method of claim 4, wherein calculating the at least one illumination parameter further comprises calculating at least a duration of at least one light pulse emitted by at least one flash lamp.

6. The method of claim 1, wherein the magnitude of image motion is further employed to set a magnitude of at least one of a duration, aperture, or gain of an imaging device for capturing the other image.

7. The method of claim 1, wherein the magnitude of image motion is further employed to set a timing of a light pulse to reduce blur of the captured other image due to motion.

8. A device, comprising:
memory for storing an image of a scene; and
one or more circuit components configured to perform actions, including:
receiving a plurality of pre-capture images from the memory;
using at least some of the pre-capture images to determine a magnitude of image motion and acceleration, including a local acceleration, of at least some of the pre-capture images; and
determining a time when to initiate capture of an other image based on the determined magnitude of image motion and at least local acceleration.

9. The device of claim 8, wherein the one or more circuit components are configured to perform actions, further including:
determining at least one exposure parameter from at least the determined magnitude of image motion; and
further employing the at least one exposure parameter to capture the other image.

10. The device of claim 8, wherein the one or more circuit components are configured to perform actions, further including:
determining at least one illumination parameter of the scene, based in part on artificial lightning of the scene, from at least the determined magnitude of image motion; and
further employing the at least one illumination parameter to capture the other image.

11. The device of claim 8, wherein at least the magnitude of motion is employed to further set at least one of a duration, intensity or timing of a light pulse emitted by at least one source of artificial light during capturing the other image.

12. The device of claim 8, wherein two or more of the pre-capture images are acquired during illumination of the scene by preview light emitted by at least one source of artificial light.

13. The device of claim 8, wherein the determined magnitude of image motion is dynamically calculated based on a last N number of pre-captured images, where N is greater than two, until a shutter press is detected.

14. The device of claim 13, wherein at least one exposure parameter is dynamically calculated based on the determined magnitude of image motion from the last N number of pre-captured images, until the shutter press is detected.

15. A camera, comprising:
an optical component for use in capturing images of a scene; and
one or more electronic components arranged to perform actions, including:
receiving a plurality of pre-capture images from the optical component;
using at least some of the pre-capture images to determine a magnitude of image motion and acceleration, including a local acceleration, of at least some of the pre-capture images; and
determining a time when to initiate capture of an other image based on the determined magnitude of image motion and at least local acceleration.

16. The camera of claim 15, wherein the one or more electronic components arranged to perform actions, including:
employing the determined magnitude of image motion and acceleration including a local acceleration to set a magnitude of at least one of a duration, intensity, or timing of a light pulse emitted by at least one source of artificial light while capturing of the other image.

17. The camera of claim 15, wherein the one or more electronic components arranged to perform actions, including:
determining at least one exposure parameter from at least the determined magnitude of image motion; and
further employing the at least one exposure parameter to capture the other image.

18. The camera of claim 15, wherein the one or more electronic components arranged to perform actions, including:

determining at least one illumination parameter of the scene, based in part on artificial lightning of the scene, from at least the determined magnitude of image motion; and further employing the at least one illumination parameter to capture the other image.

19. The camera of claim 18, wherein calculating the at least one illumination parameter further comprises calculating at least a duration of at least one light pulse emitted by at least one flash lamp.

20. The camera of claim 15, wherein the magnitude of image motion is further employed to set a magnitude of at least one of a duration, aperture, or gain of an imaging device for capturing the other image.

* * * * *

UNITED STATES PATENT AND TRADEMARK OFFICE
CERTIFICATE OF CORRECTION

PATENT NO. : 8,452,169 B2  
APPLICATION NO. : 13/369173  
DATED : May 28, 2013  
INVENTOR(S) : Eli Pozniansky et al.

Page 1 of 1

It is certified that error appears in the above-identified patent and that said Letters Patent is hereby corrected as shown below:

On the Title Page, in Item (54), and in the specification, Column 1, Line 3, in Title, delete "THE SCENCE" and insert -- THE SCENE --, therefor.

On Title Page 2, in Item (56), under "OTHER PUBLICATIONS", in Column 2, Line 6, delete "May 7, 2008." and insert -- May 7, 2009. --, therefor.

In the Specifications:

In Column 7, Line 2, delete "sensor 29," and insert -- sensor 35, --, therefor.

In Column 12, Line 14, delete "or the" and insert -- of the --, therefor.

In Column 14, Line 24, delete "of for" and insert -- of, for --, therefor.

In the Claims:

In Column 17, Line 42, in Claim 4, delete "artificial lightning" and insert -- artificial lighting --, therefor.

In Column 18, Line 15, in Claim 10, delete "artificial lightning" and insert -- artificial lighting --, therefor.

In Column 19, Line 2, in Claim 18, delete "artificial lightning" and insert -- artificial lighting --, therefor.

Signed and Sealed this  
Sixteenth Day of July, 2013

Teresa Stanek Rea  
*Acting Director of the United States Patent and Trademark Office*